3,373,860
CONVEYOR SYSTEM
George C. Lindgren, North Reading, and James R. Cowdery, Andover, Mass., assignors to J. W. Greer Company, Wilmington, Mass., a corporation of Massachusetts
Filed June 2, 1965, Ser. No. 460,722
1 Claim. (Cl. 198—34)

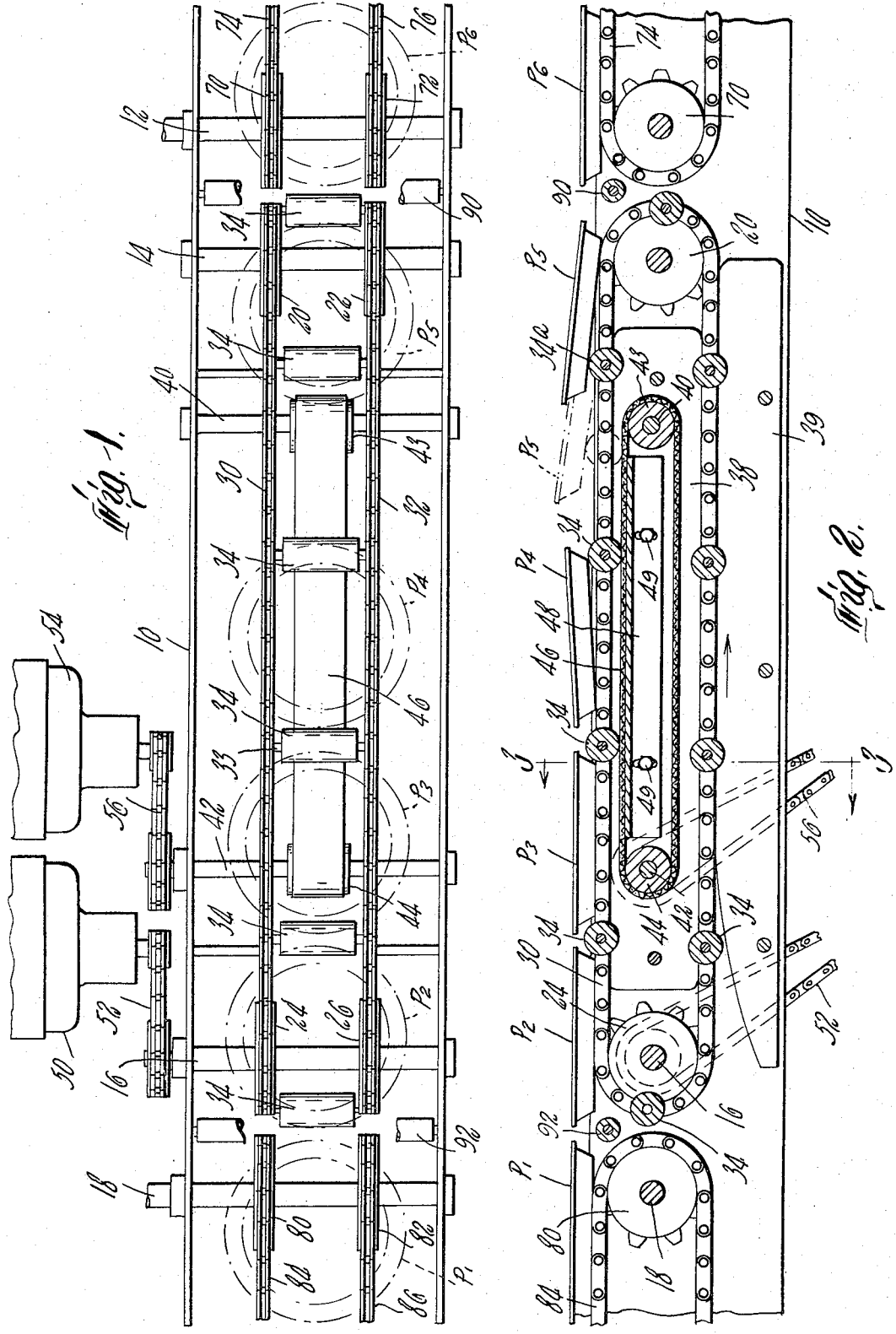

This invention relates to a conveyor system for automatically arranging a succession of articles being advanced in non-uniform spaced relation along a substantially horizontal pathway into a substantially uniform end-to-end relationship, either touching each other or uniformly spaced from each other.

It is a primary object of the invention to provide means for accelerating the motion of a succeeding article with respect to a preceding article in a line of article succession to reduce the spacing therebetween to a substantially uniform dimension as the articles advance, as may be required for capacity acceptance of the articles in subsequent processing equipment.

A further object of the invention is to incorporate a control in the mechanism for the article acceleration so that the rate of acceleration can be adjusted within limits, depending upon the amount of time that is available for completing the reduction in spacing before the article completes its passage through the mechanism.

A further object of the invention is to provide accelerating mechanism which may be actuated solely by the same drive means as actuates the conveyor, but which is supplemented by an independent compensating drive means permitting adjustment and variation within limits of the accelerating motion independent of the speed of operation of the main conveyor system.

The above and other objects of the invention will be more fully understood when taken in connection with the following description of a typical embodiment of the invention as shown in the accompanying drawings wherein:

FIG. 1 is a diagrammatic plan view of a conveyor system embodying the invention;

FIG. 2 is a longitudinal sectional view of the system shown in FIG. 1; and

Figure 3:
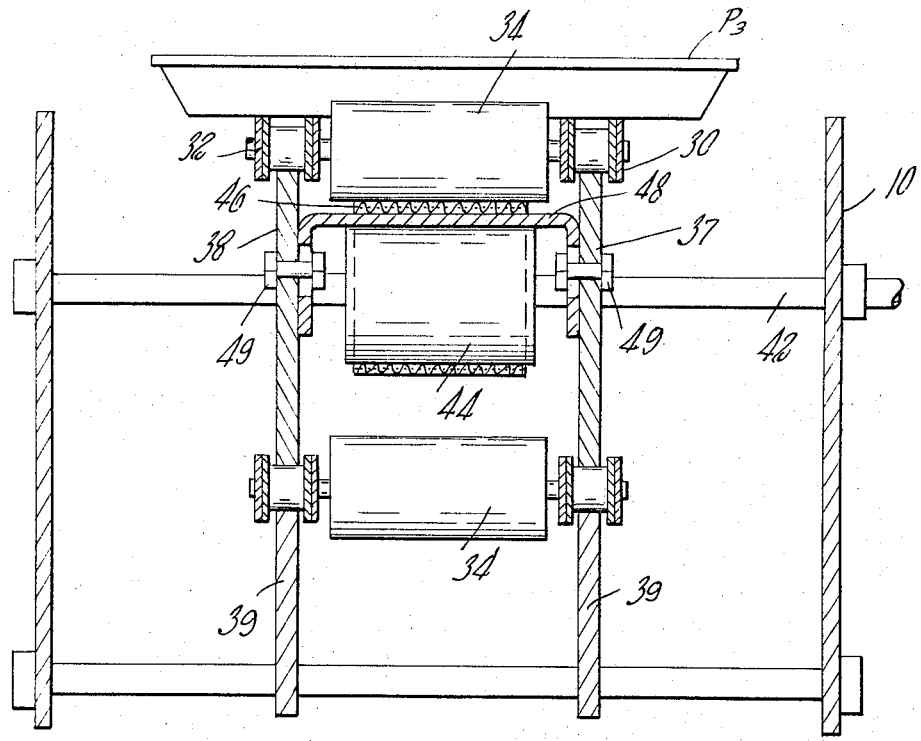
FIG. 3 is an enlarged cross-sectional view taken along the line 3—3 of FIG. 2.

The system, as shown in the drawings, comprises a frame 10 having a series of transverse sprocket-carrying shafts, 12, 14, 16 and 18. Shaft 14 has a pair of sprockets 20 and 22, while shaft 16 has a corresponding pair of sprockets 24 and 26.

A pair of central parallel spaced endless chains 30 and 32 are mounted over sprockets 20 and 24, and 22 and 26, respectively.

Carried by the chains and extending therebetween are a succession of transverse roller shafts 33, each roller shaft carrying a roller 34 which, along the upper traverse, extends above the general level of the chains 30 and 32. The rollers 34 are identical and are equally spaced along the chains. The chains are supported on their upper traverse on a pair of upper stationary tracks 38 and on their lower traverse on a pair of lower stationary tracks 39, all fixed on frame 10.

Also journaled in the frame between the sprocket shafts 14 and 16 are a pair of pulley shafts, 40 and 42, carrying pulleys 43 and 44, respectively, over which is mounted an endless belt 46.

As shown in FIG. 2, the upper traverse of the belt 46 engages the bottom of each superimposed roller 34. A bed 48, vertically adjustable through conventional bolt and slot arrangements 49, underlies the upper traverse of belt 46 to hold belt 46 firmly against rollers 34 as they pass thereover and cause their rotation.

A motor 50 is connected by chain drive 52 to sprocket shaft 16 and a separate motor 54 is connected through a chain drive 56 with pulley shaft 42.

When, therefore, motor 50 is driven in a direction to cause the endless chains to travel on the upper traverse from right to left in the direction of the arrow shown in FIG. 2, the rollers 34, passing in frictional engagement against the upper surface of the upper traverse of belt 46, will be rotated in a direction with their tops moving in the direction of chain advance and, when belt 46 is stationary, at a peripheral speed equal to twice the linear speed of the chains. If belt motor 54 is synchronized with chain motor 50 to cause belt 46 to travel with identical speed and direction with that of the chains, rollers 34 will have no rotary motion but will merely be carried bodily along with the chains. By reducing the speed of motor 54 so that belt 46 advances in the direction of the chain travel at a less speed than that of the chain travel speed, the rollers may be given rotary motion at surface speeds varying anywhere up to twice the speed of linear chain travel.

In the form shown in the drawings, the frame is extended beyond the ends of the central chain conveyor to furnish support for an ingoing conveyor, the outgoing end of which is indicated at the right of the drawings in the form of the sprocket shaft 12 carrying a pair of sprockets 70 and 72 driving a pair of chains 74 and 76.

Similarly, at the exit end, the sprocket shaft 18 carries a pair of sprockets 80 and 82 for chains 84 and 86.

Idler transfer rollers for conventional construction are shown at 90 between the input and central conveyors and at 92 between the central and output conveyors.

It is understood that the output conveyor in the form of chains 84, 86 is preferably driven at the same linear speed as the central chains 30 and 32 and, for the purposes of description, it may be assumed that the input conveyor, in the form of chains 74 and 76, is also driven at the same linear speed.

The precise spacing of the rollers 34 in the embodiment shown in the drawings along the chain is determined by the dimensions of the particular articles for which the conveyor is designed. Thus, in the drawings the articles are circular pans (although the device can equally as well function for rectangular or square articles) having tapered sides terminating in lips, of the type which are commonly used in the food industry in packaging frozen foods.

As shown in the drawings, the spacing between the rollers is just greater than the diameter of the bottoms of the pans, and all three pairs of chains are spaced transversely a distance less than the diameter of the pan bottoms.

In FIG. 2, a succession of pans P1, P2, P3, P4, P5 and P6 is shown. Pan P5 has just been transferred across the transfer roller 90 from the input conveyor onto the central chains, and in so doing, its forward bottom portions came into engagement with roller 34a as the latter rose beneath it, coming up around sprockets 20 and 22, tilting P5 into the position shown. Pan P5 is, however, a laggard with respect to the preceding pan P4, and consequently, as roller 34a comes into engagement with belt 46, it will be accelerated forwardly, as indicated by the dotted line position of P5 in FIG. 2 until its center of gravity passes beyond the axis of roller 34a and its forward end drops onto the chains and is pushed towards the preceding roller 34 until its rear end drops off roller 34a and it drops into horizontal position between the two rollers. Thus, as shown in FIG. 2, the pans P2 and P3 have come to rest on the chains between the rollers 34 in uniform spaced relation and advance in that longitudinal relationship across the transfer roller 92 onto the output conveyor chains 80 and 82. Pan P4 in FIG. 2 is just about to move beyond the roller 34 which is still in engagement with the bottom of P4.

So long, then, as the pans fed by the input conveyor chains 74 and 76 advance over the transfer roller 90 with a maximum spacing less than the distance between rollers 34, each pan will either advance between adjacent rollers 34 or be engaged from beneath by a roller 34. In the latter case, it will be propelled into a position between a pair of adjacent rollers 34 before it progresses beyond the end of the upper traverse of belt 46 so long as the rotation of the rollers is through a peripheral distance at least as great as the longitudinal dimension of the bottom of the article, and preferably, at least as great as the spacing between rollers 34. Random spacings of the pans as they cross transfer roller 90 are therefore of no consequence, within limts, as the accelerating mechanism will convert the random to uniform spacing by reason of the operation of the rollers 34 during the traverse of the pan along the central traverse.

As can be understood, the lengths of the upper traverses of chains 30 and 32 and of belt 46 can be increased to any extent desired if a longer time interval for accomplishing the accelerating motion of the pans is desired; or, if the entering pan spacing is unusually small or the traverses increased in length, the belt 46 may be driven in the direction of the advance to reduce the speed of roller rotation so that the articles will be handled more gently, as may be required in the case of liquids which would spill if the acceleration is too great.

The extent of the transverses of chains 30 and 32 and of belt 46 are illustrative only, and can be varied according to the size and type of pan being operated upon. Similarly, the spacing between the rollers can be changed according to what output spacing is desired. In the drawing, by using slightly closer spacing, the rims of the pans can be made actually to contact each other over the tops of rollers 34.

What is claimed is:

1. A method of conveying containers comprising: continuously sequentially discharging in timed relationship and in one direction a plurality of containers being transported by a first conveying means engaging the bottom portions only of said containers onto a second conveying means having an elongated traverse continuously moving forwardly in said one direction and having a plurality of container receiving portions spaced in said one direction with auxiliary container moving means located between adjacent portions of said container receiving portions, respectively, such that said bottom portions of sequential ones of said discharged containers are deposited on one of said container receiving portions or in part on the one of said auxiliary container moving means located rearwardly adjacent one of said container receiving portions not having one of said containers in its entirety deposited therein; advancing each of said containers deposited on an auxiliary container conveying means to the container receiving portion located in said one direction with respect thereto by movement of said auxiliary container conveyor means in engagement with the bottom surface of said container deposited in part thereon prior to the discharge of the next sequential container of said containers from said first conveying means; and transferring said containers being transported by said traverse at a location remote from said discharge portion of said first conveying means to other means.

References Cited

UNITED STATES PATENTS

| | | | |
|---|---|---|---|
| 2,154,844 | 4/1939 | Harker et al. | 198—183 |
| 2,272,677 | 2/1942 | Meneray et al. | 198—183 |
| 2,991,687 | 7/1961 | Henebry | 198—183 X |
| 3,292,767 | 12/1966 | Loddell | 198—34 |

EDWARD A. SROKA, *Primary Examiner.*

EVON C. BLUNK, *Examiner.*

R. J. HICKEY, *Assistant Examiner.*